(12) United States Patent  (10) Patent No.: US 8,938,729 B2
Martin et al.  (45) Date of Patent: Jan. 20, 2015

(54) TWO PASS AUTOMATED APPLICATION INSTRUMENTATION

(75) Inventors: David Brooke Martin, San Jose, CA (US); Marco Gagliardi, Brisbane, CA (US); Mark Jacob Addleman, San Francisco, CA (US)

(73) Assignee: CA, Inc., New York, NY (US)

(\*) Notice: Subject to any disclaimer, the term of this patent is extended or adjusted under 35 U.S.C. 154(b) by 488 days.

(21) Appl. No.: 12/903,102

(22) Filed: Oct. 12, 2010

(65) Prior Publication Data

US 2012/0089966 A1  Apr. 12, 2012

(51) Int. Cl.
G06F 11/36 (2006.01)
G06F 11/34 (2006.01)

(52) U.S. Cl.
CPC ........ *G06F 11/3612* (2013.01); *G06F 11/3466* (2013.01); *G06F 11/3644* (2013.01)
USPC .......................................... 717/158; 717/130

(58) Field of Classification Search
USPC ......................................................... 717/133
See application file for complete search history.

(56) References Cited

U.S. PATENT DOCUMENTS

| | | | |
|---|---|---|---|
| 7,017,155 B2 | 3/2006 | Peev et al. | |
| 7,058,957 B1 | 6/2006 | Nguyen | |
| 7,293,260 B1 | 11/2007 | Dmitriev | |
| 7,603,664 B2 | 10/2009 | Dutt et al. | |
| 8,245,210 B2 | 8/2012 | Ng et al. | |
| 8,359,582 B2 | 1/2013 | Elliott | |
| 8,555,259 B2 | 10/2013 | Krauss | |
| 2002/0199172 A1 | 12/2002 | Bunnell | |
| 2003/0088854 A1 | 5/2003 | Wygodny et al. | |
| 2003/0115584 A1 | 6/2003 | Fahs et al. | |
| 2003/0135847 A1 | 7/2003 | Gouriou et al. | |
| 2003/0149960 A1 | 8/2003 | Inamdar | |
| 2003/0163608 A1 | 8/2003 | Tiwary et al. | |
| 2004/0078691 A1 | 4/2004 | Cirne et al. | |
| 2004/0133882 A1 | 7/2004 | Angel et al. | |
| 2004/0163077 A1* | 8/2004 | Dimpsey et al. | 717/130 |

(Continued)

FOREIGN PATENT DOCUMENTS

WO 2009/095741 A1 8/2009

OTHER PUBLICATIONS

Mirgorodskiy, Alexander V., and Barton P. Miller. "CrossWalk: A tool for performance profiling across the user-kernel boundary." Advances in Parallel Computing 13 (2004): 745-752.*

(Continued)

*Primary Examiner* — Li B Zhen
*Assistant Examiner* — Joanne Macasiano
(74) *Attorney, Agent, or Firm* — Vierra Magen Marcus LLP

(57) ABSTRACT

A two-pass technique for instrumenting an application is disclosed. One pass may be performed statically by analyzing the application and inserting probes while the application is not running. Another pass may be performed dynamically by analyzing data collected by the probes while the application runs to derive metrics for the probes. One or more metrics for each probe may be analyzed to determine whether to dynamically modify the probe. By dynamically modifying the probe, the application does not need to be shut down. Dynamically modifying the probe could include removing the probe from the application or moving the probe to another component (e.g., method) in the application, as examples. For example, the probe might be moved to a component that is either up or down the call graph from the component that the probe is presently in.

11 Claims, 7 Drawing Sheets

(56) References Cited

U.S. PATENT DOCUMENTS

| | | |
|---|---|---|
| 2004/0230956 A1 | 11/2004 | Cirne et al. |
| 2005/0039172 A1 | 2/2005 | Rees et al. |
| 2005/0261879 A1 | 11/2005 | Shrivastava et al. |
| 2005/0273667 A1 | 12/2005 | Shrivastava et al. |
| 2005/0273787 A1 | 12/2005 | Kovachka-Dimitrova et al. |
| 2006/0174226 A1 | 8/2006 | Fair et al. |
| 2007/0150870 A1 | 6/2007 | Fitch et al. |
| 2007/0168998 A1 | 7/2007 | Mehta et al. |
| 2007/0234307 A1 | 10/2007 | Luk et al. |
| 2007/0283331 A1 | 12/2007 | Pietrek |
| 2008/0005726 A1 | 1/2008 | Collard |
| 2008/0034352 A1 | 2/2008 | McKinney et al. |
| 2008/0148242 A1* | 6/2008 | Cobb et al. .................... 717/130 |
| 2008/0222614 A1 | 9/2008 | Chilimbi et al. |
| 2008/0276227 A1 | 11/2008 | Greifeneder |
| 2008/0288212 A1 | 11/2008 | Greifeneder |
| 2008/0288962 A1 | 11/2008 | Greifeneder et al. |
| 2009/0013210 A1 | 1/2009 | McIntosh et al. |
| 2009/0106746 A1 | 4/2009 | Chaudhuri et al. |
| 2009/0138858 A1 | 5/2009 | Livshits et al. |
| 2009/0254889 A1 | 10/2009 | Prasadarao |
| 2009/0271769 A1 | 10/2009 | Krauss |
| 2009/0282125 A1 | 11/2009 | Jeide et al. |
| 2009/0320045 A1 | 12/2009 | Griffith et al. |
| 2010/0037211 A1 | 2/2010 | Zakonov et al. |
| 2010/0131930 A1* | 5/2010 | Ben-Chaim et al. .......... 717/127 |
| 2010/0153939 A1 | 6/2010 | Stall et al. |
| 2010/0257603 A1 | 10/2010 | Chander et al. |
| 2011/0138368 A1 | 6/2011 | Krauss |

OTHER PUBLICATIONS

Extended European Search Report dated Dec. 19, 2011, European Patent Application No. 11250847.8, 7 pages.
Preliminary Amendment dated Apr. 25, 2011, U.S. Appl. No. 12/777,490, filed May 11, 2010.
Preliminary Amendment dated Apr. 25, 2011, U.S. Appl. No. 12/777,496, filed May 11, 2010.
Extended European Search Report dated Aug. 16, 2011, European Patent Application No. 11250520.1, filed May 11, 2011, 6 pages.
Morajko et al., "Design and implementation of a dynamic tuning environment," Journal of Parallel and Distributed Computing, Elsevier, Amsterdam, NL, vol. 67, No. 4, Mar. 24, 2007, pp. 474-490, 17 pages.
Response to Search Opinion dated Sep. 5, 2012, European Patent Application No. 11250520.1-1225, 10 pages.
U.S. Appl. No. 12/777,490, filed May 11, 2010.
U.S. Appl. No. 12/777,496, filed May 11, 2010.
U.S. Appl. No. 12/777,506, filed May 11, 2010.
Dmitriev, "Design of JFluid: A Profiling Technology and Tool Based on Dynamic Bytecode Instrumentation", SMLI TR-2003-125, Nov. 17, 2003, Sun Microsystems, Inc, pp. 1-19.
Binder et al, "Advanced Java Bytecode Instrumentation", PPPJ 2007, Sep. 5-7, 2007, Lisboa, Portugal. Copyright 2007 ACM.
Response to European Office Action dated Oct. 16, 2012, European Patent Application No. 11250847.8, filed Oct. 12, 2011, 15 pages.
Response to Office Action dated Mar. 6, 2013, U.S. Appl. No. 12/777,490, filed May 11, 2010, 13 pages.
Notice of Allowance and Fee(s) Due dated Mar. 19, 2013, U.S. Appl. No. 12/777,490, filed May 11, 2010, 13 pages.
Response to Office Action dated Mar. 27, 2013, U.S. Appl. No. 12/777,496, filed May 11, 2010, 12 pages.
Response to Office Action dated Apr. 1, 2013, U.S. Appl. No. 12/777,506, filed May 11, 2010, 15 pages.
Final Office Action dated May 15, 2013, U.S. Appl. No. 12/777,506, filed May 11, 2010, 37 pages.
European Office Action dated Jun. 12, 2013, European Patent Application No. 11250847.8, filed Oct. 12, 2011, 7 pages.
Notice of Allowance and Fee(s) dated Jun. 25, 2013, U.S. Appl. No. 12/777,496, filed May 11, 2010, 32 pages.
Office Action dated Dec. 6, 2012, U.S. Appl. No. 12/777,490, filed May 11, 2010, 45 pages.
Office Action dated Dec. 28, 2012, U.S. Appl. No. 12/777,496, filed May 11, 2010, 45 pages.
Office Action dated Jan. 2, 2013, U.S. Appl. No. 12/777,506, filed May 11, 2010, 57 pages.
Response to Office Action dated Jul. 31, 2013, U.S. Appl. No. 12/777,506, filed May 11, 2010, 14 pages.
Response to European Office Action dated Oct. 14, 2013, European Patent Application No. 11250847.8, filed Oct. 12, 2011, 8 pages.
Notice of Allowance for U.S. Appl. No. 12/777,506, filed May 11, 2010, mailed May 14, 2014.
Olszewski, Marek, "JIT Instrumentation—A Novel Approach to Dynamically Instrument Operating Systems" EuroSys '07, Mar. 21-23, 2007 Lisboa, Portugal pp. 1-11.
Thiffault, Christian, "Dynamic Instrumentation of Large-Scale MPI and OpenMP Applications", 2003, Canadian National Science and Engineering Research Council, pp. 1-7.
Nethercote, Nicholas, "Dynamic binary analysis and instrumentation", University of Cambridge Computer Laboratory Nov. 2004, pp. 11-13 and 17-31.
Notice of Reasons for Rejection dated Oct. 28, 2014, Japanese Patent Application No. 2011-223320.

* cited by examiner

TWO PASS AUTOMATED APPLICATION INSTRUMENTATION

CROSS-REFERENCE TO RELATED APPLICATIONS

The following applications are cross-referenced and incorporated by reference herein in their entirety:

U.S. patent application Ser. No. 12/777,490, entitled "Conditional Dynamic Instrumentation of Software in a Specified Transaction Context," by Gagliardi et al., filed on May 11, 2010;

U.S. patent application Ser. No. 12/777,496, entitled "Detection of Method Calls to Streamline Diagnosis of Custom Code Through Dynamic Instrumentation," by Gagliardi, filed on May 11, 2010; and U.S. patent application Ser. No. 12/777,506, entitled "Fail-safe Mechanism for Dynamic Instrumentation of Software Using Callbacks," by Gagliardi et al., filed on May 11, 2010.

BACKGROUND

1. Field

The present disclosure is directed to technology for monitoring software in a computing environment.

2. Background

The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. To this end, various application management techniques have been developed.

One approach involves monitoring the infrastructure of the application by collecting application runtime data regarding the individual software components that are invoked in the application. This approach can use agents that essentially live in the system being monitored. For example, using instrumentation of the software, a thread or process can be traced to identify each component that is invoked, as well as to obtain runtime data such as the execution time of each component. Tracing refers to obtaining a detailed record, or trace, of the steps a computer program executes. Traces can be used as an aid in debugging.

However, deciding which components to instrument can be problematic. An over-inclusive approach can result in excessive overhead costs and possibly impair the operation of the application. An under-inclusive approach can miss out on collecting important information. In some cases, the problem is not with being over- or under-inclusive, but rather with selection of the proper component to instrument. For example, the desired information might be obtained by instrumenting a different component that results in lower overhead. Furthermore, determining which components to instrument can be time consuming and confusing to a user, such as a system administrator.

DETAILED DESCRIPTION

Disclosed herein are techniques for automatically inserting instrumentation (e.g., probes) into selected components of an application, and then automatically dynamically modifying the probes. As examples, a probe could be dynamically removed from the application or dynamically moved to another component in the application. Embodiments disclosed herein do not require user (e.g., system administrator) intervention to instrument the application. Initially, software such as an application may be automatically analyzed based on a set of heuristics to determine which components should have probes. Probes may be inserted statically (e.g., while the application is not running) based thereon. Then, the application is run such that the probes collect performance data such as how long a component executes. Based on the performance data, one or more metrics may be determined for each probe. Example metrics include, but are not limited to, the invocation rate of a component, the average time a component takes to execute, and concurrency of a thread associated with a component. The metric(s) for each probe may be examined to determine whether to modify the probe. For example, if a component that a probe resides in is invoked more than a threshold amount, then the probe might be removed from the application or moved to a component up the call graph. Thus, one embodiment may include a first instrumentation pass that is performed statically by analyzing the application and inserting probes while the application is not running, and a second instrumentation pass that is performed dynamically such that the application need not be shut down.

Figure 1:
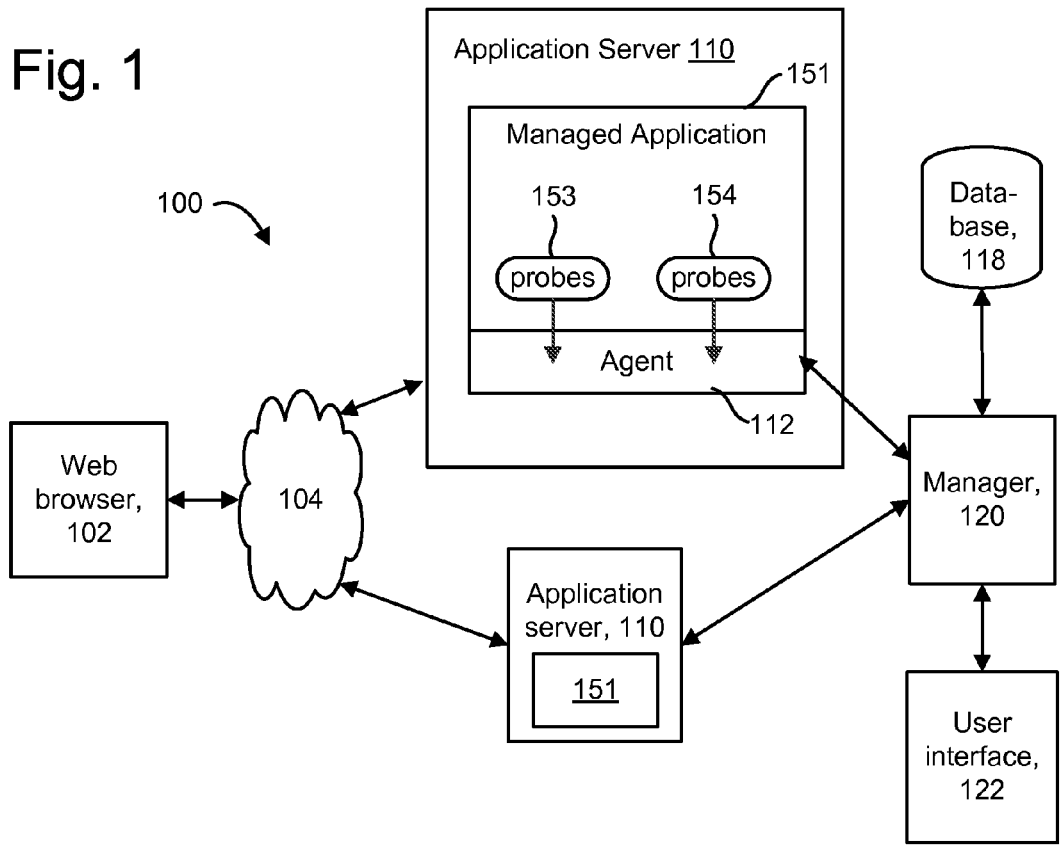
FIG. 1 depicts a system which includes a managed application.

FIG. 1 depicts a network in which different computer systems provide data to a manager. Example computer systems may include application servers 110 or any other type of computer system having a processor for executing code to achieve a desired functionality. The application servers 110 can run different applications, or separate instances of the same application. The application servers 110 can be located remotely from one another or co-located. The application servers 110 communicate with a manager computer 120, in this example. The manager computer 120 could be local or remote from the application servers 110.

For example, a corporation running an enterprise application such as a web-based e-commerce application may employ a number of application servers at one location for load balancing. Requests from users, such as from an example web browser 102 of a user, are received via the network 104 such as the Internet, and can be routed to any of the application servers 110. The web browser 102 typically accesses the network cloud 104 via an Internet Service Provider, not shown.

Application servers 110 include managed application 151, which includes agent 112 and example probes 153 and 154. There may be any number of probes. Application 151 can be a Java application or a different type of application. Thus, agent software running on the application servers 110, denoted by Agent 112, gather information from a managed application 151, middleware or other software, running on the application servers 110, in one possible approach. For example, information from the application 151 can also be obtained using probes 153 and 154. In practice, many such probes can be used to obtain information regarding different components of the application 151. In some embodiments, the probes may be added to the application 151 using instrumentation, one example of which is byte code instrumentation. However, the gathered data may be obtained in other ways as well. The agents 112 essentially live in the computer system being monitored and provide a data acquisition point. The agents organize and optimize the data communicated to the manager 120.

In one embodiment, a probe builder (not shown in FIG. 1) instruments (e.g., modifies) bytecode for application 151 to add the probes 153 and 154 and additional code. The probes may be added statically (e.g., when the application 151 is not running) or dynamically (e.g., while the application 151 is running). The probes may measure specific pieces of information regarding the application 151 without changing the application's business logic. One type of probe measures the amount of time that a component spent executing. The amount of time could include the time spent executing by components invoked by the component having the probe, but that is not required. The probe may have a begin point at an entry point of the component and an end point at each exit of the component. In one embodiment, the begin point starts a timer and the end point stops the timer. A probe may collect other information besides timing information.

The probe builder may also add agent 112 which may be installed on the same machine as application 151 or a separate machine. Once the probes have been installed in the application 151, or a monitoring capability has otherwise been provided, the application is referred to as a managed application. More information about instrumenting bytecode can be found in U.S. Pat. No. 6,260,187, "System For Modifying Object Oriented Code" by Lewis K. Cirne, and U.S. patent application Ser. No. 09/795,901, "Adding Functionality To Existing Code At Exits," filed on Feb. 28, 2001, each of which is incorporated herein by reference in its entirety.

As managed application 151 runs, probes 153 and 154 send data to agent 112. For example, the information from the probes may indicate performance data such as start and stop times of a transaction or other execution flow, or of individual components within a transaction/execution flow. In one embodiment, probes 153 and 154 may be implemented in objects and other code that write data, change data or otherwise cause the state of an application server to change. Agent 112 then collects, summarizes and sends the data, referred to as application runtime data, to Manager 120. In response, Manager 120 runs requested calculations, makes application runtime data available to user interface 112 and, optionally, sends the application runtime data to database 118 for later analysis. In one embodiment, Manager 120 uses the application runtime data to determine how to dynamically instrument the application 151. More information regarding monitoring an application using probes can be found in U.S. Patent App. Pub. No. 2004/0075690, published Apr. 22, 2004, titled, "User Interface For Viewing Performance Information About Transactions", by Lewis K. Cirne, incorporated herein by reference.

Manager 120 can be provided on a separate computer system such as a workstation which communicates with a user interface 122, such as a monitor, to display information based on data received from the agents. Manager 120 can also access a database 118 to store the data received from the agents. In the example provided, the application servers can communicate with Manager 120 without accessing the network 104. For example, the communication may occur via a local area network. In other designs, Manager 120 can receive data from the agents of a number of application servers via the network 104. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. Manager 120 and user interface display 122 might be provided at a corporate headquarters location. Other applications which are not necessarily web-based or involve retail or other sales, can similarly employ agents and managers for managing their systems. For example, a bank may use an application for processing checks and credit accounts. Moreover, in addition to the multi-computer system arrangements mentioned, a single computer system can be monitored as well with one or more agents.

Figure 2:
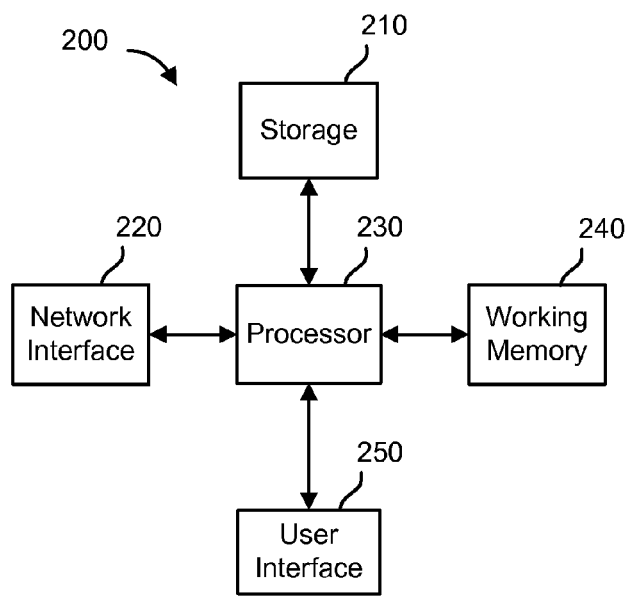
FIG. 2 depicts a computer system of the network of FIG. 1.

FIG. 2 depicts one embodiment of a computer system that may be used in the network of FIG. 1. The computer system 200 is a simplified representation of a system which might be used as the web browser 102, host (such as application servers 110), Manager 120 and/or user interface 122, such as discussed in connection with FIG. 1. The computer system 200 includes a storage device 210 such as a hard disk or portable media, a network interface 220 for communicating with other computer systems, a processor 230 for executing software instructions, a working memory 240 such as RAM for storing the software instructions after they are loaded from the storage device 210, for instance, and a user interface display 250. The storage device 210 may be considered to be a processor readable storage device having processor readable code embodied thereon for programming the processor 230 to perform methods for providing the functionality discussed herein. The user interface display 250 can provide information to a human operator based on the data received from one or more agents. The user interface display 250 can use any known display scheme, whether graphical, tabular or the like. In addition to an on-screen display, an output such as a hard copy such from a printer can be provided.

Further, the functionality described herein may be implemented using hardware, software or a combination of both hardware and software. For software, one or more processor readable storage devices having processor readable code stored thereon for programming one or more processors may be used. The processor readable storage devices can include computer readable storage such as volatile and nonvolatile media, removable and non-removable media. For example, computer readable storage may include volatile and nonvolatile, removable and non-removable media implemented in any method or technology for storage of information such as computer readable instructions, data structures, program modules or other data. Examples of computer readable storage include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more computer readable storage devices, peripherals and/or communication interfaces.

Figure 3:
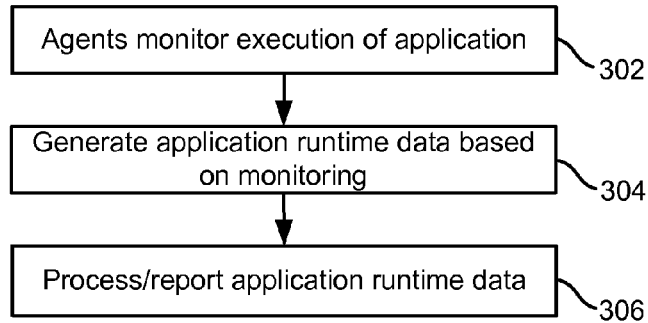
FIG. 3 illustrates a flowchart of an embodiment of monitoring a network service.

In some embodiments, the agents 112 monitor the applications 151 and transfer application runtime data to Manager 120, where the data is analyzed and reported to user. FIG. 3 illustrates a flowchart of an embodiment of a process of monitoring applications 151. The process may be performed in the example system 100 of FIG. 1. An application 151 is monitored by agents 152 at step 302. Monitoring may involve agents 112 determining which transactions of application server 110 are processed and the duration for which they are invoked when the application processes a client request. Step 302 may include probes in the application 151 executing to collect data.

Application runtime data based on the monitoring of the application is generated at step 304. The generated application runtime data can indicate the application components involved in processing a request, the duration that each component consumed in processing a request, and other information. The application runtime data can be generated by agent 112, based on data that results from execution of the probes, after which the agent 112 may forward the generated application runtime data to Manager 120. Generally, application runtime data can include information such as average component (e.g., method) execution time, a component invocation rate per second or per interval, a count of component invocations, a concurrency metric indicating number of component invocations that have started but not finished per interval, and a stalled metric indicating a number of component invocations that have started whose component invocation times have exceeded a specific threshold per interval. Further, application runtime data can identify a garbage collection heap size, a bandwidth metric indicating file and socket activity, a number of threads, system logs, exceptions, memory leaks and component interactions. Note that the application runtime data may be linked to particular transactions being processed by the managed application 151.

The application runtime data may be processed and reported by Manager 120 at step 306 such as by aggregating the data, storing the data, and providing the data to an operator through an interface or other user interface 112.

Figure 4:
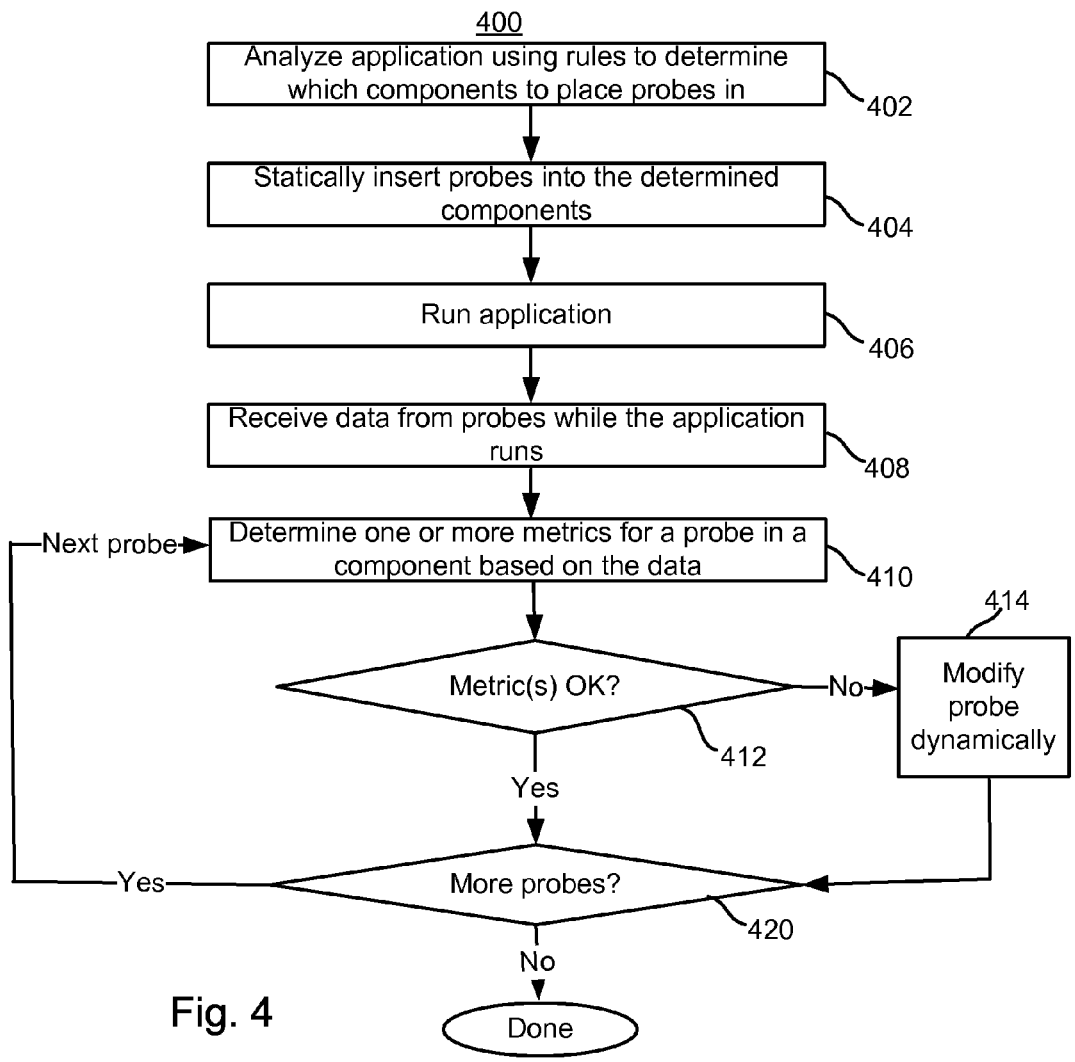
FIG. 4 is a flowchart depicting one embodiment of a process for two-pass automated instrumentation of an application.

FIG. 4 is a flowchart depicting one embodiment of a process 400 for two-pass automated instrumentation of an application. One pass may automatically statically instrument the application 151; the other may automatically dynamically instrument the application. Process 400 may be used in system 100 to automatically instrument (e.g., add probes) to managed application 151. In step 402, the application 151 is automatically analyzed to determine which components to place probes into. This analysis may take place statically. Thus, the application 151 does not need to be running while it is analyzed. In one embodiment, a set of heuristics is used to determine the locations (e.g., components) to place the probes. For example, if a component has a loop or a lock, a determination may be made that the component should have a probe.

In step 404, probes are automatically inserted into the locations (e.g., components) that were determined in step 402. The probes may be inserted statically, which means that the probes are inserted while the application 151 is not running. Further details of steps 402 and 404 are discussed with respect to FIGS. 8A and 8B.

In step 406, the application 151 is run with the probes inserted. For example, the application 151 receives requests from web browsers 102 and processes transactions in response to those requests. Particular examples of requests include, but are not limited to, a user login to a web site, a request to purchase a product from the website, and a credit card verification.

In step 408, data is received from the probes while the application 151 runs. For example, the agents 112 receive data from the probes and send the data on to Manager 120. This data may include performance data such as how much long a component executes.

In step 410, one or more metrics are determined for a first of the probes based on the data received in step 408. For sake of discussion, the first probe was originally placed in a first component (e.g., method) in the application 151. The metric (s) may be based on the performance data collected by the first probe, as well as performance data collected by other probes. However, in general, the metric(s) may involve the execution of the first component. One metric may be how frequently the first component is invoked. This information may be useful in determining whether to remove the probe form the application or move the probe to another component in the application. Another metric may involve concurrency. For example, the number of concurrent threads running can be determined as one metric. In other words, the number of concurrent threads associated with the first component may be determined. One metric may involve an average execution time. For example, the average time for which the first component executes may be determined. Manager 120, one of the agents 112, or another entity may determine the metric(s).

In step 412, a determination is made as to whether the first probe should be modified based on analysis of the one or more metrics. As one example, if the invocation rate of the first component is too high, then the first probe should be modified.

If it is determined that the first probe should be modified, then the first probe is modified is some manner, in step 414. Example modifications include, but are not limited to, removing the first probe from the application 151 and moving the first probe to another location (e.g., component) in the application 151. It is also possible to provide different types or levels of instrumentation, e.g., a high level of instrumentation, in which many aspects of the performance of a component are tracked, and a low level of instrumentation, in which only a few aspects of the performance of a component are tracked. Thus, the modification could be to modify how the probe is implemented within the component. As one example, if the probe has instructions within a program loop, those instructions might be removed. In some embodiments, the modifications are made dynamically, while the application 151 is running. Thus, the application 151 does not need to be shut down to modify the probe. Further details of steps 410-414 are discussed with respect to the discussion of FIG. 5.

Whether or not the first probe is modified, processing then continues by making a determination as to whether there are additional probes, in step 420. If so, then the process 400 returns to step 410 to determine one or more metrics for the next probe. Processing may continue until all probes have been analyzed. The result may be that some probes are removed from the application, some probes are moved to other components in the application, and other probes are not changed. Other modifications may be made to probes.

Figure 5:
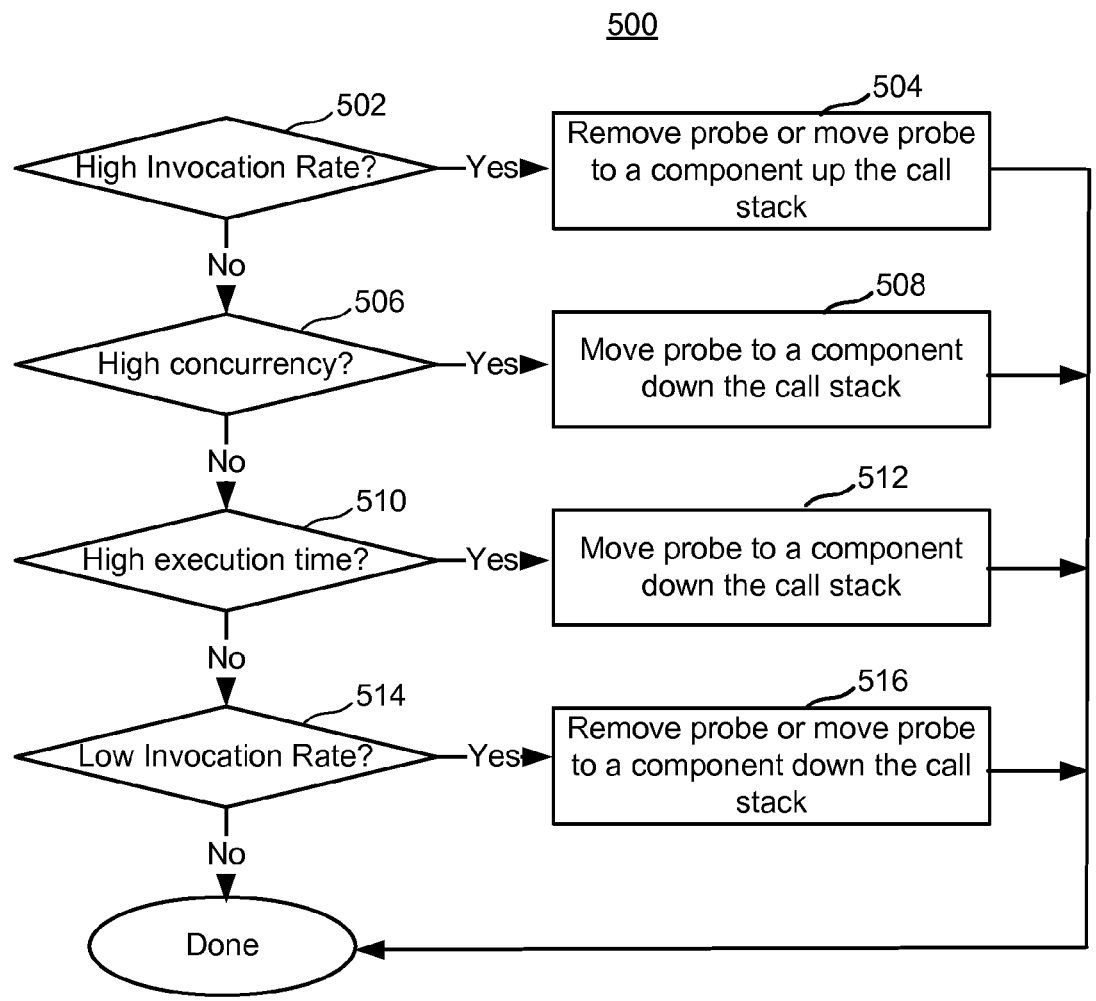
FIG. 5 is a flowchart of one embodiment of a process of processing metrics associated with a probe to determine whether or not to modify the probe, and then making an appropriate modification dynamically.

FIG. 5 is a flowchart of one embodiment of a process 500 of processing metrics associated with a probe to determine whether or not to modify the probe, and then making an appropriate modification dynamically. Process 500 is one embodiment of steps 410, 412, and 414 of process 400. Process 500 describes analyzing different metrics for one probe and may be repeated for additional probes. In step 502, an invocation rate of the component in which the probe resides is compared to a threshold to determine whether there is a high invocation rate. The invocation rate refers to how many times the probe executed over some period. Note that this may be for similar instances of the component on different servers. For example, in system 100 different application servers 110 may run different instances of the managed application 151. Therefore, the component for the probe being analyzed may have a separate instance in each instance of the managed application. Thus, the invocation rate could be the total number of invocations for all instances of the component. However, it is not required to measure invocations in this manner. For example, the invocation rate could be based on a single instance of the managed application or any subset of instances of the managed application. In one embodiment, the invocation rate is determined by counting the total invocations of the component over some time period.

In step 502, this invocation rate may be compared to some threshold value. The threshold may be hard coded or it may be variable. In one embodiment, the user (e.g., system administrator) is allowed to set the threshold. It is not required that the same threshold be used for all probes. As noted, the probes may have been originally inserted in the application 151 based on analysis of the application. The threshold may also be set based on the analysis. For example, heuristics that are used to determine which components to place the probe in may also indicate a threshold for the probe. As a specific example, a probe that is inserted because there was a program loop may have a different threshold from a probe that was inserted because there was a lock.

If the invocation rate is higher than the threshold, then the probe may be removed from the application or it may be moved to a component up the call graph from the component it is in. As noted earlier, the removing or moving may be performed dynamically without shutting down the application 151. Note that the removing or moving of the probe may be for all or some subset of instances of the application 151. In one embodiment, the probe is always removed in the case the invocation rate is higher than the threshold. In one embodiment, the probe is always moved to a component up the call graph, if possible, in the case the invocation rate is higher than the threshold. Note that it may not always be possible to move the probe to a component up the call graph. In one embodiment, a determination is made as to either remove or move the probe. The determination as to whether to remove or move the probe may be made in a variety of ways. As one example, the decision could be made on the invocation rate itself. For example, the invocation rate could be compared to a second threshold to determine whether to move or remove the probe. As another example, additional information could be examined. The determination of whether to remove or move could be based on analysis of code in the component currently containing the probe or other components in the call graph (such as candidate components to move the probe to). As still another example, the determination to remove or move the probe could be based on analysis of other metrics (e.g., concurrency, execution time, etc.). Further details of deciding what other component to move the probe to are discussed below.

Note that if the probe is moved to another component, this does not mean that the probe will remain exactly the same. As used herein, "moving the probe to another component," or similar phrases, means that rather than having a probe in the first component, a probe is inserted into the other component. Because the other component will, of course, have different instructions, the new probe may be tailored to that new component. For example, in some embodiments, the probe has a start timer at the entry point of the component and a stop timer at each exit point. Therefore, after moving the probe, it may have a different number of stop timers. In some embodiments, the probe has instructions placed near program loops in a component. Therefore, if the new component has a different number of loops, this may impact the instructions used to implement the probe.

If the probe is either removed from the application 151 or moved to another component, then process 500 may end. Otherwise, process 500 continues at step 506 to process the next metric for the probe. In step 506, a concurrency that is related to the component the probe is in is compared to a threshold. The concurrency may be for how many instances of a thread related to the component in which the probe resides concurrently execute. This concurrency could be an average concurrency value. For example, Manager 120 might determine an instantaneous concurrency value for a particular thread for different points in time. Then, an average concurrency (e.g., mean, median, mode) may be determined. Another example is to determine the maximum concurrency value for the thread over some time period. Note that a separate concurrency value could be made for each server 110, data from all servers 100 could be used to determine a single concurrency value, etc. Numerous other ways can be used to determine a concurrency value.

In step 506, the concurrency value may be compared to a threshold. The threshold may be hard coded or it may be variable. In one embodiment, the user (e.g., system administrator) is allowed to set the threshold. It is not required that the same threshold be used for all probes. The threshold may also be set based on the analysis of the application (e.g., when the probe was originally inserted).

If the concurrency value is higher than the threshold, then the probe may be moved to a component down the call graph from the component it is in, in step 508. As noted earlier, the moving may be performed dynamically without shutting down the application 151. Note that the moving of the probe may be for all or some subset of instances of the application 151. In the event that there is not a component down the call graph, a decision can be made to either remove the probe from the application or keep it in place, for example.

If the probe is moved in step 508, then process 500 may end. Otherwise, process 500 continues at step 510 to process the next metric for the probe. In step 510, an execution time that is related to the component the probe resides in is compared to a threshold. The execution time may be for how long the component executes. This may or may not include the execution time of the components that are invoked by the component the probe resides in. However, the execution time is not required to be for the component in which the probe resides executes. Another example is for the execution time to be for a type of transaction that is executed at least in part by the component. For example, the execution time might be for a login transaction or buy product transaction that is executed at least in part by the component. The execution time could be an average (e.g., mean, median, mode) execution time. Note that a separate execution time could be made for each instance of the application 151, data from all servers 100 could be used to determine a single (average) execution time, etc. Numerous other ways can be used to determine an execution time.

In step 510, the execution time may be compared to a threshold. The threshold may be hard coded or it may be variable. In one embodiment, the user (e.g., system administrator) is allowed to set the threshold. It is not required that the same threshold be used for all probes. The threshold may also be set based on the analysis of the application (e.g., when the probe was originally inserted).

If the execution time is higher than the threshold, then the probe may be moved to a component down the call graph from the component it is in, in step 512. As noted earlier, the moving may be performed dynamically without shutting down the application 151. Note that the moving of the probe may be for all or some subset of instances of the probe in different instances of the application 151. In the event that there is not a component down the call graph, a decision can be made to either remove the probe from the application 151 or keep it in place, for example.

If the probe is moved to another component in step 512, then process 500 may end. Otherwise, process 500 continues at step 514 to process the next metric for the probe. In step 514, an invocation rate of the component is compared to a threshold to determine whether the invocation rate is low. This may be the same invocation rate is discussed in step 502, although that is not required. Thus, the invocation rate may refer to how many times the component executed over some period. This invocation rate is compared to some threshold value. This threshold may be different from the threshold in step 502 (which may have been a high threshold). In contrast, a low threshold may be used in step 514. The low threshold may be hard coded or it may be variable. In one embodiment, the user (e.g., system administrator) is allowed to set the low threshold. It is not required that the same low threshold be used for all probes.

If the invocation rate is lower than the low threshold, then the probe may be removed from the application or be moved to a component down the call graph from the component it is in. As noted earlier, the removing or moving may be performed dynamically without shutting down the application 151. Note that the removing or moving of the probe may be for all or some subset of instances of the application 151. In one embodiment, the probe is always removed in the case the invocation rate is lower than the low threshold. In one embodiment, the probe is always moved to a component down the call graph, if possible, in the case the invocation rate is lower than the low threshold. Note that it may not always be possible to move the probe to a component down the call graph. In one embodiment, a determination is made as to either remove or move the probe. Factors such as those discussed above for the high invocation rate may be used (note that different factors may be used for the high and low invocation rates).

Process 500 then concludes as there are no more metrics to process for this probe. Note that the metrics could be processed in a different order. In one embodiment, moving the probe to a component up the call graph is preferred to moving the probe to a component down the call graph. Therefore, the order of testing the metrics can be selected to favor this preference. Process 500 is one example that favors moving the probe up the call graph.

As described in process 500, once analysis of one metric results in a determination that the probe should be removed or moved, then the probe may be moved or removed without examination of further metrics. However, multiple metrics could be examined to help determine what action to take. For example, if there is a high invocation rate, then the concurrency or the execution time could be examined to determine whether to either remove or move the probe.

As mentioned above, process 500 may be repeated for other probes. However, it is not required that the exact sequence of process 500 be used for all probes. For example, for some probes, the execution time might be tested prior to testing the concurrency. Numerous techniques can be used to determine the order in which the metrics (e.g., steps 502, 506, 510, 514) are applied to the different probes. Also note that different metrics could be applied to different probes. For example, the execution time metric (step 510) might not be used when analyzing certain probes. Other metrics not explicitly listed in process 500 might also be used.

Figure 6:
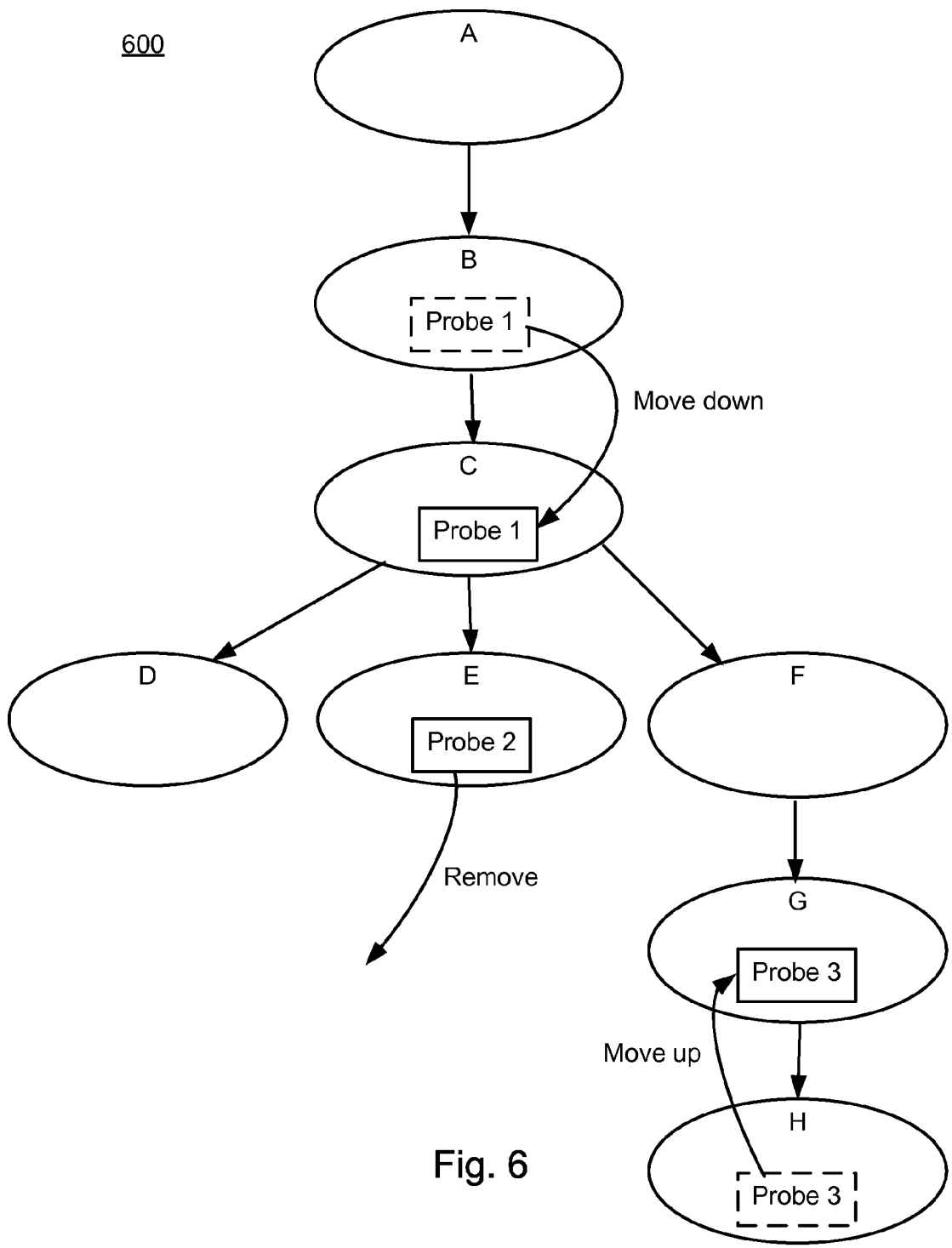
FIG. 6 is an example call graph.

FIG. 6 is an example call graph 600 which will be used to illustrate aspects of process 500, as well as other techniques described herein. Components are depicted in an application which may run on an application server such as application server 110 of FIG. 1. Component A is at the top level of the call graph and invokes component B, which in turn invokes component C. Component C invokes components D, E, and F. Component F invokes component G, which invokes component H. Note that when an application is instrumented typically only selected components are automatically instrumented based on analysis of the application 151. Thus, many components, at least initially, may be invoked/called in an application, but are not instrumented.

Component oriented programming models are useful in allowing the programmer to assemble an application or other program from building blocks referred to as components. Each component can perform a specific function which fits in with an overall functionality of the software. Furthermore, a component can call other components, as well as calling itself, in a recursive call, so that a sequence of components is invoked in a program. The components are examples of resources in a computer system that are consumed, or work that is done, when a program executes. One example of a component oriented programming model is J2EE, which can employ components such as a Java Server Page, an Enterprise Java Bean, a servlet, and a Java Database Connectivity component. However, other component oriented programming models may also be used, such as those using Microsoft .NET components. Moreover, the programming model need not be object oriented. In one approach, the components are methods.

It may be that the components (such as B) near the upper level of the call graph 600 are rarely invoked, but take a long time to execute because of internal calls. Components (e.g., components G, H) at the lower level of call graph may be frequently invoked. However, each time such lower level components run they might only execute for a short time. In some cases, the information that is really important can be determined by having probe in components at the upper level of the call graph. In some cases, the information that is really important can be determined by having probe in components at the lower level of the call graph.

For the sake of illustration, component B was automatically instrumented with Probe 1 because it has a lock in it, component E was automatically instrumented with Probe 2 because it has a loop, and component H was automatically instrumented with Probe 3 because it has a loop. This may have been performed in step 404 of process 400. However, as will be discussed below, Probe 1 may be moved down the call graph to component C and Probe 3 may be moved up the call graph to component G. This may be performed in step 414 of process 400 (or one of steps 504, 508, 512, or 512 of process 500).

If a probe is in a component that is high in the call graph 600, the execution time may be long; however, the invocation rate may be low. It may be that not enough is learned from the probe in this case. One option is to move the probe to a component down the call graph in order to determine more interesting information. Probe 1 in component B will be used to illustrate. At runtime, Probe 1 in component B may collect information regarding how much time was spent with component C invoked. For example, there might be a timer at the point at which component C is invoked from component B. However, the probe in component B may not be able to determine how much time was spent executing in the lower levels such as components D-H. In this case, moving Probe 1 to a component down the call graph can help to learn more information.

As note in steps 510-512 of process 500 when a component has a high execution time the probe for the component may be moved to a component down the call graph 600. As one example, Probe 1 that was automatically inserted into component B may have a high execution time due to all of the components below it in the call graph 600 being invoked. Therefore, Probe 1 may be moved to a lower level, such as component C, or to a different component at a still lower level of the call graph 600. Note that the invocation rate of component B should be below the high threshold such that step 502 does not result in removing Probe 1 or moving it up the call graph 600 (as depicted in steps 502-504 of process 500).

Probe 1 in component B might be moved down the call graph 600 for a reason other than high execution time. For example, Probe 1 in component B might be moved due to an invocation rate that is less than the low threshold. As depicted in steps 514-516 of process 500, when a component has a low invocation rate, its probe may be moved to a component down the call graph 600. Thus, Probe 1 that was automatically inserted into component B may be moved to a lower level, such as component C.

Note that when moving a probe to a component down the call graph 600, it may be moved to any component down the call graph 600. In one embodiment, the probe is moved down a single level. After re-running the application 151, the probe might be moved down again. However, the probe might be moved down further. For example, Probe 1 might be moved down from component B to component F or G.

On the other hand, if a probe is in a component at a lower level of the call graph 600, the execution time may be short, but the invocation rate may be high. Thus, one option is to move the probe to a component up the call graph 600. This may allow similar information to be collected, but with lower overhead. Probe 3 in component H will be used as an example. For the sake of illustration, on average, when component H is invoked the loop executes 1,000 times. Thus, in this example, at least some of the instructions of Probe 3 might execute 1,000 times due to their location in component H. Of course, it is not a requirement that Probe 3 be located in a position in component H such that its instructions are invoked with each execution of the loop; however, this example is one possibility. Thus, for the sake if illustration, component H has a high invocation rate, as discussed in step 502 of process 500.

At runtime, Probe 3 in component H collects information regarding how much time was spent with component H invoked. Although this may be useful information, because the loop in component H executes 1,000 times, there may be an overhead problem associated with Probe 3 (or some of its instructions) executing. That is, execution of instructions associated with Probe 3 within the loop in component H may significantly increase the execution time of component H.

Therefore, Probe 3 may be moved up the call graph 600 to component G. When component G is invoked, it may be that Probe 3 does not contribute excessively to overhead as it did when component H was invoked. However, useful information is still gained. For example, since component G invokes component H, Probe 3 still is able to determine the time that component H takes to execute. Moreover, Probe 3 could still determine how frequently component H is executed.

Next, Probe 2 in component E will be discussed. For the sake of illustration, the loop in component E executes only an average of twice with each invocation of component E. Therefore, in this example, Probe 2 does not contribute to excessive overhead even it has instructions in the loop. Because component E does not invoke any other components, for the sake of argument, it does not have a high execution time. Moreover, for the sake of argument, the invocation rate of component E is neither greater than the high threshold nor less than the low threshold. Further, for the sake of argument, there is not a high concurrency for component E. Thus, none of the metrics in process 500 indicate that Probe 2 should be removed or moved. Therefore, Probe 2 may remain in component E.

However, as another example, the invocation rate of component E may be low, in which case Probe 2 may be removed from the application 151 (depicted in FIG. 6). Note that in this example, there is not another component down the call graph 600 from component E. Therefore, the determination of whether to remove the probe or move it to a component down the call graph 600 may be made based on the whether a component exists down the call graph 600.

Figure 7:
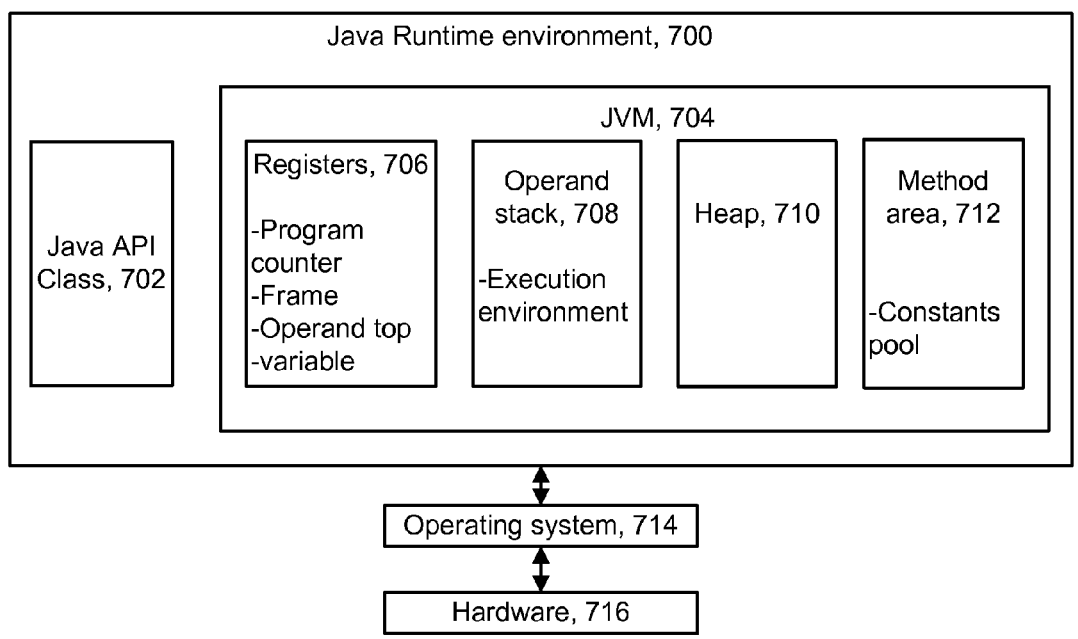
FIG. 7 depicts a JAVA runtime environment.

FIG. 7 depicts a JAVA runtime environment. Some embodiments operate within a JAVA runtime environment. The JAVA runtime environment 700 is built on an operating system, 714, which is built on hardware 716. The JAVA runtime environment includes a number of virtual parts, including the JAVA API Class 702 and a JVM 704. The JVM includes registers 706, an operand stack 708, a heap 710 and a method area 712. The JVM processes a stream of byte codes as a sequence of instructions. A JVM instruction consists of an opcode specifying the operation to be performed, followed by zero or more operands embodying values to be operated upon. The operand stack, heap and method area are within addressable memory. The size of an address is 32 bits, each memory location contains one byte, and each register stores one 32-bit address. The method area contains byte codes and is aligned on byte boundaries, while the operand stack and the heap are aligned on word (32-bit) boundaries.

The registers includes a program counter (pc), which keeps track of where in the memory it should be executing instructions. The program counter identifies the next byte code to be executed. The frame register contains a pointer to the execution environment of the current method in the operand stack. The operand top (optop) register contains a pointer to the top of the operand stack, and is used to evaluate arithmetic expressions. The variable (vars) register contains a pointer to local variables.

The operand stack supplies parameters to methods and operations and receives results back from them. All byte code instructions take operands from the stack, operate on them, and return results to the stack. The operand stack includes a stack frame of an executing method. The stack frame holds the state, e.g., local variables, and intermediate results of calculations, for a particular invocation of a method. Specifically, each JVM thread has a private JVM stack, created at the same time as the thread. A JVM stack stores frames, holds local variables and partial results, and plays a part in method invocation and return. A frame is thus used to store data and partial results, as well as to perform dynamic linking, return values for methods, and dispatch exceptions. A new frame is created each time a method is invoked. A frame is destroyed when its method invocation completes, whether that completion is normal or abrupt (it throws an uncaught exception). Frames are allocated from the JVM stack of the thread creating the frame. Each frame has its own array of local variables, its own operand stack, and a reference to the runtime constant pool of the class of the current method.

The heap or memory allocation pool is garbage collected. The heap is the runtime data area from which memory for all class instances and arrays is allocated. The heap is created on virtual machine start-up, and heap storage for objects is reclaimed by an automatic storage management system known as a garbage collector. Specifically, each program running in the Java runtime environment has a garbage-collected heap assigned to it. Moreover, each class in the heap has a constant pool associated with it. Because constants do not change, they are usually created at compile time. Items in the constant pool encode all the names used by any method in a particular class. The class contains a count of how many constants exist, and an offset that specifies where a particular listing of constants begins within the class description.

The method area stores byte code instructions that are associated with methods in the compiled code, and a symbol table which the execution environment needs for dynamic linking Any debugging or additional information that might need to be associated with a method is stored in this area as well. The program counter always points to, e.g., contains the address of, some byte in the method area. The program counter is used to keep track of the thread of execution. After a byte code instruction has been executed, the program counter will contain the address of the next instruction to execute.

The method area is shared among all JVM threads, and stores per-class structures such as the runtime constant pool, field and method data, and the code for methods and constructors, including the special methods used in class and instance initialization and interface type initialization. The method area is created on virtual machine start-up. A runtime constant pool is a per-class or per-interface runtime representation of the constant_pool table in a class file. It contains several kinds of constants, ranging from numeric literals known at compile time, to method and field references that must be resolved at run time. Each runtime constant pool is allocated from the JVM's method area. The runtime constant pool for a class or interface is constructed when the class or interface is created by the JVM.

Figure 8A:
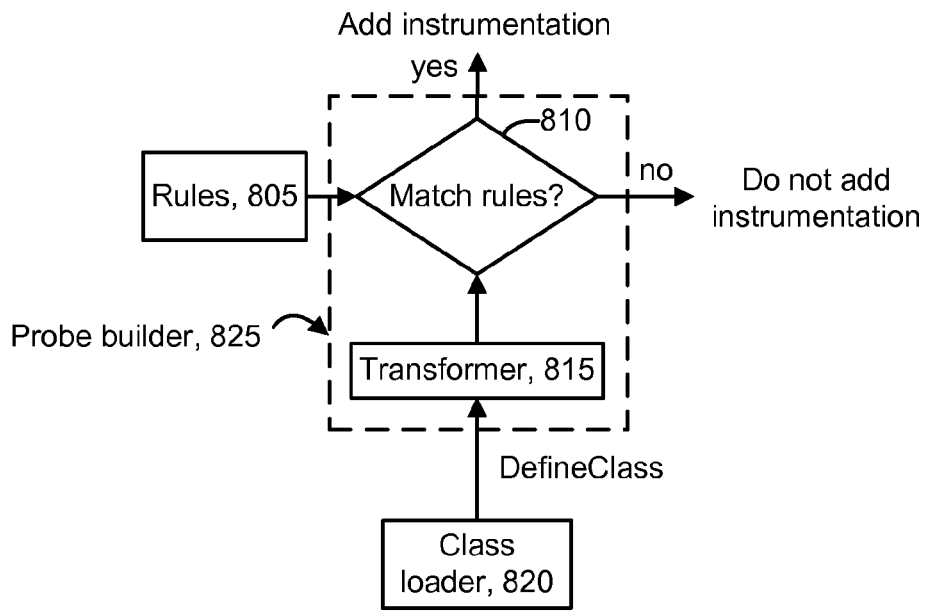
FIG. 8A depicts a JAVA-based example process flow for automatic instrumentation.

FIG. 8A depicts a JAVA-based example process flow for static instrumentation. Static instrumentation may be based on analysis of the application when it is not running. The process may be implemented by an agent, such as the agent 112 of FIG. 1, in one possible approach. The process of FIG. 8A is one technique for analyzing the application 151 and inserting probes, as discussed in step 402-404 of process 400. One approach to instrumentation involves providing static rules 805 (or heuristics) which determine which components, such as methods, are to be instrumented. The rules 805 may be accessed at the time the components are loaded into the application.

In some embodiments, at least some of the rules 805 look for loop statements (e.g., while . . . do, do . . . while, for . . . , etc). One reason for this is that a source of variability with some code (e.g, JAVA) is loop statements. Further, loops may be a good proxy for external application factors that can introduce variability into an application (e.g. data set size). Therefore, methods that have loops may be a good set of instrumentation points to monitor. In one embodiment, byte-code (e.g., JAVA bytecode) is parsed to identify jump instructions (e.g., goto, goto_w, jsr, jsr_w, ret) to find those jump instructions with negative offsets to indicate a potential loop within a method. If a jump instruction contains a negative offset, an instrumentation point (e.g., probe) may be inserted in the method. For example, a probe having a begin point and one or more end points may be inserted. As one specific example, a begin point may be inserted in the method entry and an end point may be inserted at all exits of the method.

In such an approach, a class loader 820 is used to provide raw data bytes of an application byte code to a transformer 815, which transforms the raw bytes into a class, for instance. For example, in JAVA, this may involve using the method defineClass of the ClassLoader object, which is responsible for loading classes. The class ClassLoader is an abstract class. Given the name of a class, a class loader should attempt to locate or generate data that constitutes a definition for the class. A typical strategy is to transform the name into a file name and then read a "class file" of that name from a file system. The method defineClass converts an array of bytes into an instance of class Class. Instances of the class Class represent classes and interfaces in a running JAVA application. The transformer 815 is thus software which can transform byte code to add instrumentation, such as by transforming classes. In one approach, the minimum unit of processing of the transformer 815 is a class file and its byte array.

If the application byte code matches rules (directives) 805 at a decision block 810, the transformer 815 adds probes in the form of tracer byte code. If the application byte code does not matches the rules 805 at the decision block 810, the transformer 815 does not add instrumentation to the byte code. The transformer 815 and the decision block 810 may be considered to be part of a probe builder 825.

In this implementation, the rules 805 are a set of typically static rules that identify portions of the managed application which are to be instrumented. The rules may be implemented when a class is defined in a virtual machine for the first time. A class can be loaded multiple times while being defined only once. For example, there can be multiple class loaders loading the same class. Further, components such as classes may be instrumented based on whether they are named a certain way, whether they implement a certain interface, whether they extend a certain subclass or super class, and so forth. Such components are selected to be instrumented because it is believed they might provide performance data which is useful or otherwise interesting.

For instance, a rule may indicate that all servlets should be instrumented since it is believed that at least some of the servlets may provide interesting data. In this case, the rules 805 may indicate that all components that are subclasses of the JAVA class HttpServlet should be instrumented. HttpServlet is an abstract class from which all servlets depend. However, not all components can be instrumented, and there is a tension in that over-inclusive instrumentation results in excessive overhead costs and possibly impairing the operation of the application, while under-inclusive instrumentation results in the omission of important performance data.

Figure 8B:
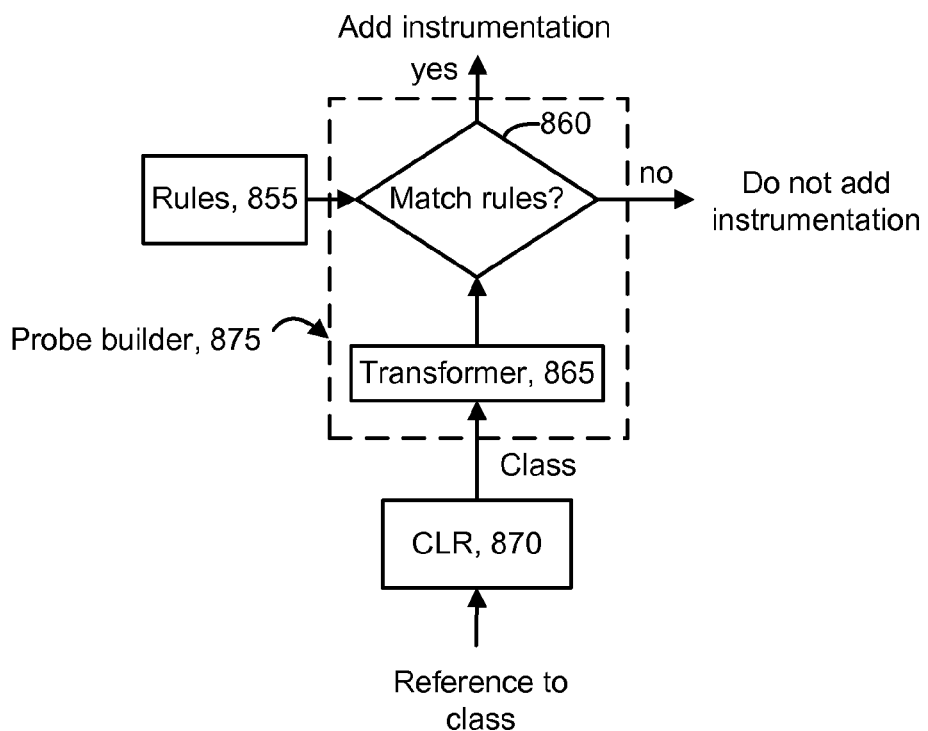
FIG. 8B depicts a .NET-based example process flow for automatic instrumentation.

FIG. 8B depicts a .NET-based example process flow for static instrumentation. The process of FIG. 8B is one technique for analyzing the application 151 and inserting probes, as discussed in step 402-404 of process 400. In this possible approach, the components of the managed application are provided according to the MICROSOFT CORP. ".NET" Framework. Unlike JAVA, the .NET framework does not use class loaders. Instead, .NET includes a virtual machine that manages the execution of programs written specifically for the framework. The runtime environment of the .NET framework is known as the Common Language Runtime (CLR). The CLR provides the appearance of an application virtual machine so that programmers need not consider the capabilities of the specific CPU that will execute the program. The CLR also provides other services such as security, memory management, and exception handling. A class library of pre-coded solutions and the CLR together compose the .NET Framework.

Moreover, the CLR is an implementation of a Common Language Infrastructure (CLI) which provides a language-neutral platform for application development and execution, including functions for exception handling, garbage collection, security, and interoperability. The CLI includes the core class libraries, Common Type System, and the Common Intermediate Language (CIL). As with JAVA byte code, CIL is another example of intermediate byte code. JAVA and .NET provide example implementations only, as other implementations are possible.

Here, the process may be implemented by an agent 112, in one possible approach. In one possible scenario, some process in the .NET framework references a class by name, and the CLR 870 finds the class, shows it to a transformer 865 (if any) and uses the resultant CIL. In particular, if the class matches rules 855 at a decision block 860, instrumentation is added. If the class does not match the rules 855 at the decision block 860, instrumentation is not added. The transformer 865 and the decision block 860 may be considered to be part of a probe builder 875.

Figure 9:
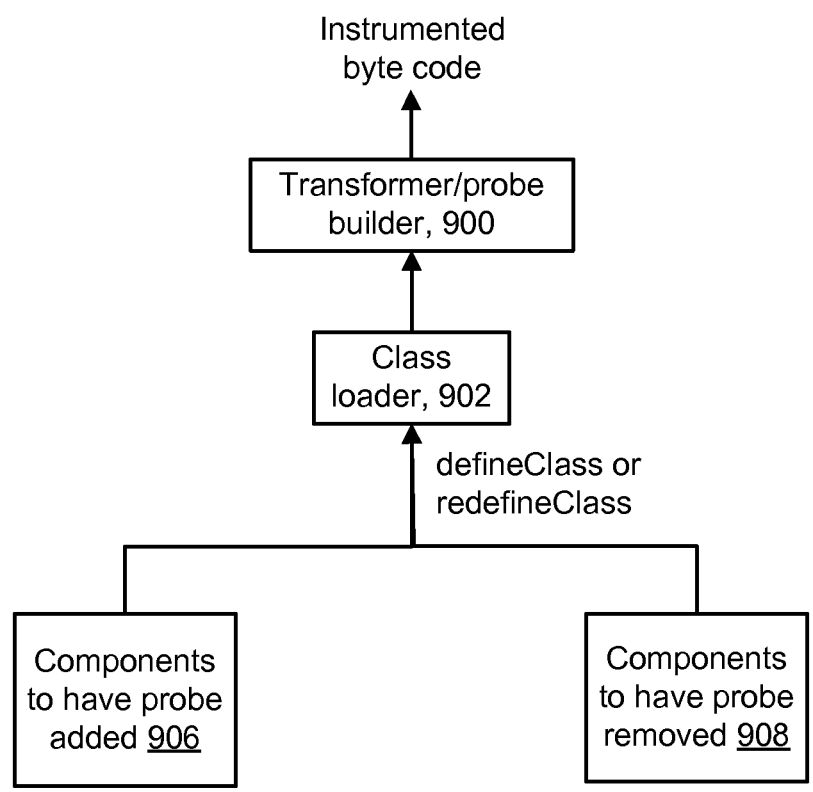
FIG. 9 depicts an example process flow for dynamically instrumenting software.

FIG. 9 depicts an example process flow for dynamically instrumenting software. The process flow may be used to remove a probe from an application, or to move a probe to another location (e.g., component). Thus, the process may be used when implementing step 414 of process 400, or steps 504, 508, 512, or 516 of process 500. There is a list of components to have probes removed 908 and a list of components to have probes added 908. When a probe is to be moved, one component may have the probe removed and another may have the probe added. Therefore, list 906 may include those components to which a probe is being moved. List 908 may include those components from which a probe is being moved and those components for which the probe is being removed from the application.

The lists 908, 910 can be provided to a class loader 902, which loads byte code for use by a transformer/probe builder 900 to provide instrumented byte code. The byte code could optionally be compiled into machine code. For instance, the method defineClass converts an array of bytes into an instance of class Class.

Thus, a component can be redefined, so that it transitions, e.g., from not having instrumentation at one point in time, to having instrumentation at another point in time. Also, a component can be redefined, so that it transitions, e.g., from having instrumentation at one point in time, to not having instrumentation at another point in time.

It is also possible to provide different types or levels of instrumentation, e.g., a high level of instrumentation, in which many aspects of the performance of a component are tracked, and a low level of instrumentation, in which only a few aspects of the performance of a component are tracked. Redefining a component can thus involve a transition to a different type of instrumentation.

Instrumentation can yield many types of performance metrics/data, including an average execution or response time of a component, an invocation rate per second or per interval, a count of invocations, a concurrency metric indicating a number of invocations that have started but not finished per interval, and a stalled metric indicating a number of invocations that have started whose method invocation times have exceeded a specific threshold per interval. Further, the data can identify a garbage collection heap size, a bandwidth metric indicating file and socket activity, a number of threads, system logs, exceptions, memory leaks and component interactions. The data can also identify which components are called by the instrumented component or which call the instrumented component. For instance, in a controller architecture, control flows in through a controller component, which has control over which components are executed next, and knows how often they are executing and how they are performing.

In one approach, the list of the components to have probes removed 908, and the list of components to have probes added 906 may be persisted so that the next time the system 100 starts up, the same components are instrumented/not instrumented. In other words, it is not required that all of the components that might otherwise be determined by static analysis (see steps 402-404, FIG. 4) be again statically instrumented if the system is re-started.

A component can be redefined in different ways according to whether the component has already been incorporated into the application at runtime. If a component is not already incorporated into the application, it can be incorporated normally by being loaded by the class loader 902 such as in a JVM, in one possible implementation. In other implementations, such as those which use the .NET framework, a class loader is not used.

When a component is loaded, the transformer/probe builder 900 instruments the component if instructed, e.g., in response to, components to have a probe added 906, and components to have a probe removed 908. A component which is already incorporated into the application, but is not instrumented, can be reincorporated into the application with instrumentation. For example, the component can be removed from the application and reloaded during the runtime without restarting the virtual machine. To achieve this, the JAVA redefineClass command is provided to the class loader 902 with the component. The JAVA DEVELOPMENT KIT (JDK) version 1.5 or higher has a redefinition capability which uses this command. This command redefines a supplied set of classes using supplied class files. It operates on a set in order to allow interlocked changes to more than one class at the same time. Moreover, if a redefined method has active stack frames, those active frames continue to run the byte codes of the original method, and the redefined method will be used on new invokes.

Redefining a component such as a class is analogous to restarting the virtual machine but only for that class. When a class is redefined, if the class is already in existing method stacks, it stays there. But, for every new method invocation, the new class is used. That is, once it is redefined, the new version is picked up.

When the transformer/probe builder 900 receives the redefined component, it instruments the component, if instructed to do so. As mentioned, the transformer/probe builder 900 may also remove instrumentation in the component. The transformer/probe builder 900 could also add a specified type of instrumentation to the component.

The adding and removal of instrumentation can be done dynamically at runtime so that the virtual machine in which the byte code is executing does not have to be brought down, and data from the instrumented components can be accessed immediately (in the case of adding instrumentation).

One embodiment disclosed herein includes a machine-implemented method for instrumenting an application having a plurality of components. The method may include the machine-implemented steps of automatically analyzing the application to determine which of the components to place probes in; automatically adding probes in the determined components; receiving data from the probes while the application runs; determining one or more metrics for a first of the probes in a first of the components based on the data; determining, based on the one or more metrics for the first probe, whether to modify the first probe; and repeating the determining one or more metrics and the determining whether to modify for additional probes.

One embodiment disclosed herein includes computer readable storage having computer readable instructions stored thereon for programming at least one processor to perform a method for instrumenting an application. The method may include: statically analyzing the application to determine locations in the application to place probes; statically adding probes to the application in the determined locations; collecting data by the probes while the application runs; determining one or more metrics for a first of the probes based on the data; determining, based on the one or more metrics for the first probe, whether to remove the first probe from the application; determining, based on the one or more metrics for the first probe, whether to move the first probe to another location in the application; and repeating the determining one or more metrics, the determining whether to remove the probe from the application, and the determining whether to move the probe to another location for additional probes.

One embodiment disclosed herein includes a system having one or more processors; and computer readable storage coupled to the one or more processors. The computer readable storage has computer readable instructions stored thereon which, when executed on the one or more processors, cause the one or more processors to instrument an application having a plurality of components. The one or more processors: a) automatically analyze the application to determine which of the components to statically place probes in; b) automatically add probes to the application in the determined components while the application is not running; c) receive data from the probes while the application runs; d) determine one or more metrics for a first of the probes in a first of the components based on the data; e) determine, based on the one or more metrics for the first probe, whether to move the first probe to another component in the application; f) move the first probe to another component in the application while the application is running if the determination in said e) so indicates; g) determine, based on the one or more metrics for the first probe, whether to remove the first probe from the application; h) remove the first probe from the application while the application is running if the determination in said g) so indicates; and i) repeat said d) through said h) for additional probes.

The foregoing detailed description has been presented for purposes of illustration and description. It is not intended to be exhaustive or to limit embodiments to the precise form disclosed. Many modifications and variations are possible in light of the above teaching. The described embodiments were chosen in order to best explain the principles of embodiments and their practical applications, to thereby enable others skilled in the art to best utilize various embodiments and with various modifications as are suited to the particular use contemplated. It is intended that the scope of the disclosure be defined by the claims appended hereto.

What is claimed is:

1. A machine-implemented method for instrumenting an application having a plurality of components, comprising:
automatically statically analyzing the application to determine which of the components in the application to place probes in;
automatically statically adding probes in the determined components while the application is not running;
running the application after statically adding the probes;
receiving data from the statically added probes while the application runs;
determining metrics for a first of the statically added probes in a first of the components based on the data, the metrics comprising an execution time of the first component and an invocation rate of the first component;
moving the first statically added probe to a component in the application up a call graph from the first statically added probe when the invocation rate of the first component is greater than a first threshold;
moving the first statically added probe to a component in the application down the call graph when the invocation rate of the first component is less than a second threshold that is less than or equal to the first threshold;
moving the first statically added probe to a component in the application down the call graph when the execution time of the first component is greater than a third threshold providing that the invocation rate of the first component is not greater than the first threshold, wherein the moving the first statically added probe up or down the call graph comprises moving the first statically added probe while the application is running;
repeating, for additional statically added probes, the determining and the moving the additional probe up or down the call graph.

2. The machine-implemented method of claim 1, wherein the moving the first statically added probe comprises inserting a probe into a component up or down the call graph from the first statically added probe while the application is running.

3. The machine-implemented method of claim 1, further comprising:
removing a second statically added probe that is in a second component of the plurality of components from the application when the invocation rate of the second component is less than the second threshold and if there is not a component below the second component in the call graph.

4. The method of claim 3, further comprising:
removing the second statically added probe from the application when the invocation rate of the second component is greater than the first threshold and when there is not a component above the second component in the call graph.

5. The machine-implemented method of claim 1, wherein the metrics further comprise a number of concurrent invocations of the first component, and further comprising moving the first component to a component down the call graph when the number of concurrent invocations of the first component is greater than a fourth threshold.

6. The method of claim 1, wherein the second threshold is less than the first threshold.

7. The method of claim 1, further comprising:
removing, from the application, a second statically added probe that is in a second component of the plurality of components when the invocation rate of the second component is greater than the first threshold and when there is not a component above the second component in the call graph.

8. Non-transitory computer readable storage having computer readable instructions stored thereon for programming a processor to:

statically analyze an application having a plurality of components to determine components in the application to place probes;

statically add probes to the application in the determined components while the application is not running;

execute the application after statically adding the probes;

collect data by the statically added probes while the application runs;

determine metrics for a first of the statically added probes in a first of the components based on the collected data, the metrics comprising an execution time of the first component and an invocation rate of the first component;

move the first statically added probe to a component in the application up a call graph from the first statically added probe when the invocation rate of the first component is greater than a first threshold;

move the first statically added probe to a component in the application down the call graph from the first component when the invocation rate of the first component is less than a second threshold that is less than or equal to the first threshold;

move the first statically added probe to a component in the application down the call graph when the execution time of the first component is greater than a third threshold providing that the invocation rate of the first component is not greater than the first threshold, wherein the moving the first statically added probe up or down the call graph comprises moving the first statically added probe while the application is running;

repeat, for additional statically added probes, the determining and the moving the additional probe to a component up or down the call graph.

9. The non-transitory computer readable storage of claim 8, wherein the instructions program the processor to determine whether a concurrency of the first component is greater than a fourth threshold based on the data from the statically added probes, the instructions program the processor move the first probe to a component down the call graph when the concurrency of the first component is greater than the fourth threshold.

10. A system having:
a processor; and
computer readable storage coupled to the processor, the computer readable storage having computer readable instructions stored thereon, the computer readable instructions which, when executed on the processor, cause the processor to instrument an application having a plurality of components, the processor being configured to:

a) automatically statically analyze the application to determine which of the components in the application to statically place probes in;

b) automatically statically add probes to the application in the determined components while the application is not running;

c) receive data from the statically added probes while the application runs;

d) determine metrics for a first of the statically added probes in a first of the components based on the data, the metrics comprising an execution time of the first component and an invocation rate of the first component;

e) move the first statically added probe to a component in the application up a call graph from the first statically added probe when the invocation rate of the first component is greater than a first threshold;

f) move the first statically added probe to a component in the application down the call graph from the first component when the invocation rate of the first component is less than a second threshold that is less than or equal to the first threshold;

g) move the first statically added probe to a component in the application down the call graph when the execution time of the first component is greater than a third threshold providing that the invocation rate of the first component is not greater than the first threshold, wherein the moving the first statically added probe up or down the call graph comprises moving the first statically added probe while the application is running;

h) repeat said d) through said g) for additional statically added probes.

11. The system of claim 10, wherein based on the data from the statically added probes the processor determines whether a concurrency of a thread associated with the first component is greater than a fourth threshold, the processor moves the first probe to a component down the call graph from the first component when the concurrency of the thread associated with the first component is greater than the fourth threshold.

* * * * *